A. H. SWEET.
CLUTCH MECHANISM.
APPLICATION FILED AUG. 24, 1915.
1,197,409.
Patented Sept. 5, 1916.
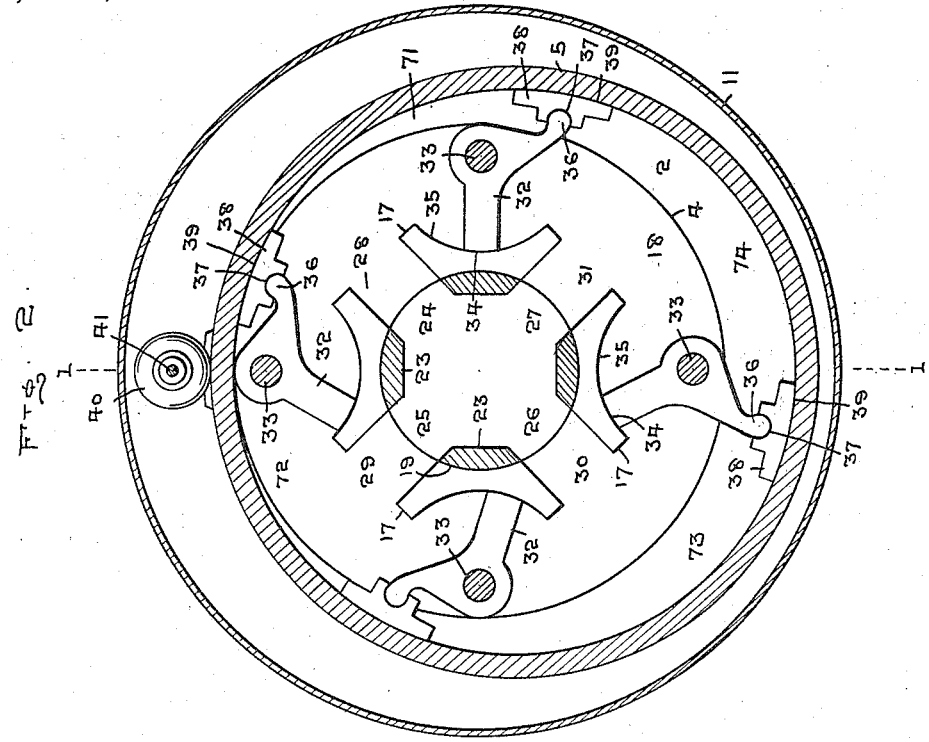
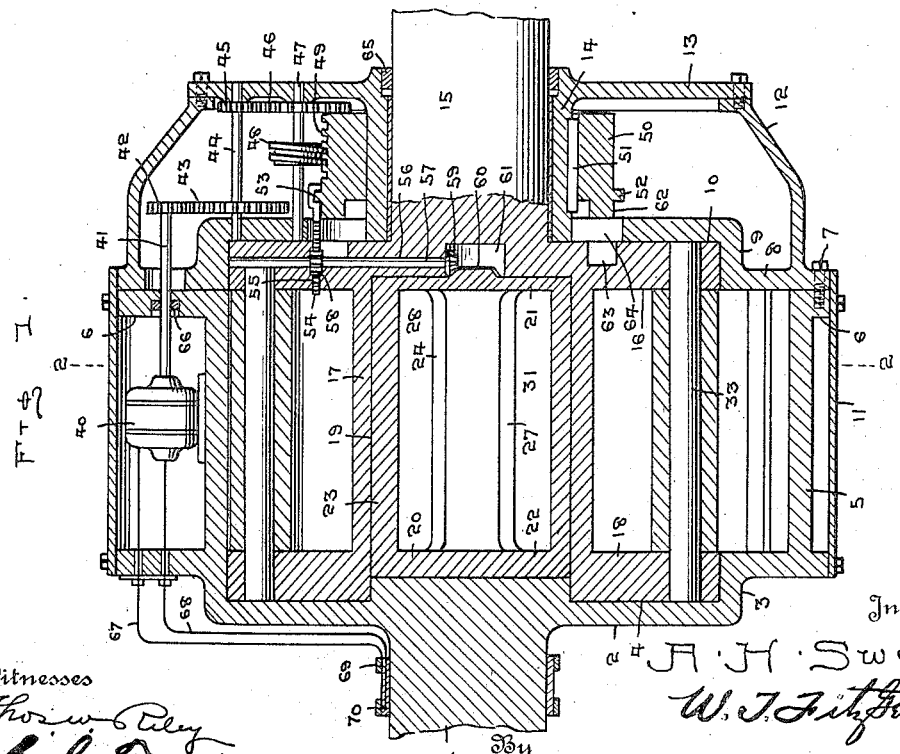
Witnesses
Thos. W. Riley
C. S. Frye
Inventor
A. H. Sweet
W. J. Fitzgerald
By
Attorneys

UNITED STATES PATENT OFFICE.

ALLEN H. SWEET, OF ST. LOUIS, MISSOURI, ASSIGNOR, BY MESNE ASSIGNMENTS, TO SWEET POWER TRANSMISSION COMPANY, OF ST. LOUIS, MISSOURI, A CORPORATION OF MISSOURI.

CLUTCH MECHANISM.

1,197,409.      Specification of Letters Patent.      Patented Sept. 5, 1916.

Application filed August 24, 1915. Serial No. 47,092.

*To all whom it may concern:*

Be it known that I, ALLEN HERBERT SWEET, a citizen of the United States, residing at St. Louis, in the State of Missouri, have invented certain new and useful Improvements in Clutch Mechanism; and I do hereby declare the following to be a full, clear, and exact description of the invention, such as will enable others skilled in the art to which it appertains to make and use the same.

My invention relates to improvements in fluid-clutches and the like, and in some of its features more particularly to the valve-control means for power-transmission devices of the type shown and described in my copending application Serial No. 874,787, filed November 30, 1914.

One of the objects of my invention is to provide improved valve-actuating means that may be completely housed within the casing of the valved power-transmitting structure, and operated electrically to control the valve-position.

Another object of my invention is to provide improved means for such valve control that may be operated by a rotary-motor, electrically actuated.

A further object of my invention is to provide a valve control construction for devices of the character specified, that is simple, economical and efficient. And a still further object is to provide a construction by which the rotatable parts may be locked together positively by a portion of the valve-controlling means, after full valve-closure has been effected. And a further object is to provide automatically operated means for positively locking the fixed and movable parts together.

Other objects and advantages will be hereinafter set forth and more particularly pointed out in the accompanying specification.

In the accompanying drawings which are made a part of this application, Figure 1 is a central sectional view through the clutch, as seen on line 1, 1 of Fig. 2, and Fig. 2 is a sectional view, as seen on line 2, 2 of Fig. 1.

Referring to the drawings in which similar reference numerals designate corresponding parts throughout the several views, 1 indicates the driving shaft which is connected directly to the driving motor (not shown) to the end of which is attached a radial flange 2, said flange being preferably formed integral with the shaft 1 and concentric therewith, said flange having an offset portion 3 to form an annular recess 4 on the inner face of the flange for a purpose to be hereinafter set forth. Formed integral with the inner face of the flange 2 is a cylindrical casing 5 eccentrically arranged around the axis of the driving shaft 1, the free end of the casing having a peripheral flange 6 which is concentric with the axis of the driving shaft and of the same diameter as the diameter of the flange 2.

Secured to the flange 6 by means of bolts 7, or other suitable means, is an auxiliary flange 8, said auxiliary flange also having an offset portion 9 to form a recess 10, which recess is likewise concentric with the axis of the driving shaft and alined with the recess 4.

Surrounding the cylindrical casing 5 and attached to the peripheral edges of the flanges 2, 6 and 8 is a housing 11, said housing being concentric with the axis of the driving shaft 1 and inclosing the casing 5.

Attached to the auxiliary flange 8 is an auxiliary casing 12, to the open end of which is attached the flange 13 and a hub member 14, said hub member being integral with the flange 13 and extending inwardly therefrom. Extending through the hub member 14 is a driven shaft 15, integral with the inner end of which is formed a disk 16, said disk being concentric to the axis of the shafts 1 and 15 and snugly fitting within the recess 10, said disk having arms 17 formed integral therewith which arms carry at their opposite ends a disk 18 which snugly seats in the recess 4, said arms 17 being so arranged as to form a seat or cage 19 for a valve 20.

The valve 20 comprises end sections 21 and 22 which are connected by a hollow sleeve 23, said sleeve having longitudinally extending slots 24, 25, 26 and 27 which are adapted to register with ways 28, 29, 30 and 31 between the arms 17 when the valve is in open position. The inner faces of the arms 17 are concaved to receive the convex surface of the valve 20 so that said valve can readily rotate between said arms to bring the slots of the valve in registration with the ways between the arms or to dispose the solid portion of the sleeve over the ways to close passage therethrough. The interior of the cylindrical casing 5 is divided into compartments by partition plates 32 which extend longitudinally between the disks 16 and 18 and are pivotally mounted upon rods 33 carried by said disks, the ends 34 of the blades being curved to snugly fit the curved outer faces 35 of the arms 17, the curvature of said faces being concentric to the axis of the rods 33 so that the curved ends of the blades 32 will contact with the curved faces 35 at whatever angle the blades may extend. The opposite end of each blade is provided with a bead 36 which enters a socket 37 formed in the inner face of a shoe 38, said shoe having a curved outer face 39 which travels against the inner peripheral face of the cylindrical casing 5 and snugly fits thereagainst to prevent the passage of liquids between the shoe and face of the casing.

The valve 20 is mechanically operated to open and close the same through the medium of an electric motor 40 which is preferably attached to the peripheral wall of the cylindrical casing 5 and between said cylindrical casing and the housing 11, a sufficient space being provided for the reception of the motor by placing the cylindrical casing 5 eccentrically to the housing 11.

The shaft 41 of the motor projects through the flanges 6 and 8 and into the auxiliary casing 12, the free end of the shaft having a gear 42 attached thereto which meshes with a gear 43 carried by a shaft 44, the ends of the shaft being pivotally mounted in the flanges 8 and 13. The shaft 44 also has fixed thereto a pinion 45 which meshes with a gear 46 mounted upon a shaft 47, which shaft is likewise rotatably mounted in the flanges 8 and 13. The shaft 47 has a worm gear 48 fixed thereon which meshes with teeth 49 on the peripheral face of a collar 50, said collar surrounding the hub member 14 and being longitudinally movable thereon but caused to rotate with the hub member through the medium of a feather 51.

The inner end of the collar 50 is provided with a circumferential rib 52 which engages a channel 53 formed in the end of a rack bar 54, said rack bar extending transversely through a slot 55 in the auxiliary flange 8 so that when the collar 50 is moved lengthwise of the hub member, the rack bar will move longitudinally through said slot.

Extending through a bore 56 in the disk 16 is a shaft 57, said shaft having a pinion 58 fixed thereon which meshes with the teeth of the rack bar 54 and is rotated thereby, the inner end of the shaft 57 having a beveled gear 59 fixed thereon which meshes with a bevel gear 60 at the axial center of the end section 21 of the valve 20, a recess 61 being formed at the axial center of the disk 16 for the reception of said beveled gears.

By this form of device, it will be seen that when the motor is operated, the rack bar 54 will be moved longitudinally through the medium of the various gears and collar 50, thereby rotating the shaft 57 which will result in rotating the valve 20 to open or close the ways between the arms 17. In addition to employing the collar 50 for moving the rack bar longitudinally it is also employed for locking the driving parts of the clutch in fixed relation with the driven parts, this result being accomplished by studs 62 at the inner end of the collar 50, which studs are adapted to enter sockets 63 formed in the face of the disk 16, the auxiliary flange 8 having a circular opening 64 through which the studs and end of the collar may freely pass to engage the sockets in said disk, said opening also permitting the rack bar 54 to extend therethrough without engagement with the auxiliary flange 8.

The fluid within the clutch is prevented from leaving the housing by providing suitable packing 65 in the end of the hub member 14 around the driving shaft 15 and packing 66 around the shaft 41 in the flange 6.

The electric current is conveyed to the motor 40 through wires 67 and 68, one end of the wires being attached to the motor while the opposite ends thereof are secured respectively to contact rings 69 and 70, said contact rings being attached to any suitable electric circuit and so controlled that when the positive current is directed through the ring 69 and wire 67 and the negative current through the ring 70 and wire 68, the motor will be driven in one direction and when the positive current is directed through the ring 70 and wire 68 and the negative current through the ring 69 and wire 67, the motor will be driven in the opposite direction thereby placing the collar under positive control for operating the valve or for interlocking the parts of the clutch together.

The interior of the cylindrical casing 5 is divided into compartments 71, 72, 73 and 74 and when the parts are in the position shown in Fig. 2, the compartments 71 and 72 will be smaller in extent than the compartments 73 and 74 in view of the fact that the cylindrical casing is eccentric to the axis of the disks carrying the arms and valve.

In operation, when the slots in the valve are in registration with the ways between the arms and the arms in the position shown in Fig. 2 and power is applied to the driving shaft 1, the parts attached to the driving shaft will readily rotate around the driven shaft and parts carried thereby without effecting the movement of the driven shaft, as the fluid, preferably oil, contained within the cylindrical casing 5, will readily pass through the openings of the valve from one compartment to the other.

When it is desired to drive the shaft 15, a current is directed into the motor 40 in such manner as to move the collar 50 longitudinally of the hub member 14 thereby rotating the gear 59 and moving the valve 20 until the slots through the wall thereof are out of registration with the ways between the arms 17, thus preventing the movement of the oil contained within the casing, from one compartment to the other. In view of the fact that a greater amount of the fluid is in the compartments 73 and 74, as the cylindrical casing is rotated around the valve and parts carrying the same, the fluid within said compartments 73 and 74 will be compressed to such an extent as to cause the shaft 15 and parts carried thereby to rotate with the driving shaft and by the time the driven parts begin to rotate with the driving parts, the studs 62 will have moved into engagement with the sockets 63, thereby positively locking the driving and driven parts together.

When it is desired to stop the driven shaft without stopping the engine, a reverse current is directed through the motor 40, thereby causing the same to operate in reverse action to that previously described thereby returning the collar to its initial position and moving the slots in the valve into registration with the ways between the arms and permitting the driving parts of the clutch to rotate without effecting the movement of the driven parts.

Having thus fully described my invention what I claim as new and desire to secure by Letters Patent of the United States is:—

1. In a fluid clutch, a casing, disks rotatably mounted within said casing, arms connecting said disks, one of said disks having sockets formed therein, a collar carried by the casing, studs on the collar adapted to enter said sockets, and electrically controlled means for moving said studs into or out of engagement with said sockets.

2. A fluid clutch, comprising a driving shaft and casing, a driven shaft having connected disks independently movable in said casing, a valve incased within the casing and disks, a collar having means connected therewith to rotate said valve, and electrically controlled means for operating said collar.

3. In a fluid clutch, a driving shaft, a cylindrical casing carried by the driving shaft, a driven shaft, disks carried by the driven shaft, arms connecting said disks, a valve rotatable between said arms, a shaft carried by one of the disks, intermeshing gears on the shaft and valve, and means to rotate said shaft in either direction to open and close the valve.

4. In a fluid clutch, a driving shaft and casing, a driven shaft and disk independently rotatable of the driving shaft and casing, a controlling valve, a movable collar, means interposed between the collar and valve to open and close the same, an electrically controlled motor and gears interposed between the motor and collar for operating said collar and valve operating mechanism.

5. In a fluid clutch, a driving shaft, a driven shaft, disks carried by the driven shaft, arms connecting said disks and forming a valve cage, a valve rotatably mounted between said arms, said valve having slots therein, casings carried by the driving shaft surrounding said disks and valve, and electrically controlled means for rotating said valve to bring the slots of the valve into or out of registration with the ways between said arms.

6. In a fluid clutch, a driving shaft having an integral casing and an auxiliary casing attached to the integral casing, a hub member carried by the auxiliary casing, a driven shaft extending through said hub member, a valve cage carried by the driven shaft, said valve cage having ways therein, a valve rotatably mounted in said cage, said valve having slots adapted to register with the ways in the cage, a collar rotatable with and longitudinally movable of the hub member, studs carried by the collar adapted to interlock with parts of the valve cage and hold the driven part in fixed relation with the driving part, means coöperating with the collar to rotate said valve, and means to move said collar lengthwise of the hub member in either direction.

7. In a fluid clutch, a driving shaft and casing, a driven shaft and disks coöperating therewith, means carried by the casing of the driving shaft adapted to interlock with one disk of the driven shaft, a rotatably mounted valve incased within the driving and driven parts of the clutch, a gear at one end of the valve, a shaft carried by the casing, a gear on the shaft coöperating with the gear of the valve, a pinion carried by the shaft, a rack bar coöperating with said pinion, and means to operate said rack bar to open or close said valve.

8. The combination with two relatively-rotatable members providing between them an eccentric space, and means dividing said space into a plurality of compartments, of a rotary valve within the inner member for controlling communication between the compartments, a housing carried by the outer member, and valve control means within said housing comprising an electric motor, and means operable by said motor for rotating said valve.

9. The combination with two relatively-rotatable members providing between them an eccentric space, and means dividing said space into a plurality of compartments, of a rotary valve within the inner member for controlling communication between the compartments, a rotary shaft, a motor for rotating said shaft, and reduction gearing for communicating rotation from said shaft to said valve.

10. The combination with two rotatable members, rotatable relative to each other, providing between them an eccentric interspace, means dividing said interspace into a series of compartments, a rotary valve controlling communication between said compartments; a shiftable element connected with the valve to rotate the latter and arranged when in valve-closing position to effect positive connection between the two members and when in other positions to free said members for relative rotation, and electro-responsive means for shifting said element.

In testimony whereof I have signed my name to this specification in the presence of two subscribing witnesses.

ALLEN H. SWEET.

Witnesses:
 CHAS. BACHAR,
 JOHN A. PALMER.